(12) United States Patent
Bocking

(10) Patent No.: US 11,599,266 B2
(45) Date of Patent: *Mar. 7, 2023

(54) METHOD AND SYSTEM FOR MANAGING UNREAD ELECTRONIC MESSAGES

(75) Inventor: Andrew D. Bocking, Waterloo (CA)

(73) Assignee: BlackBerry Limited, Waterloo (CA)

( * ) Notice: Subject to any disclaimer, the term of this patent is extended or adjusted under 35 U.S.C. 154(b) by 1681 days.

This patent is subject to a terminal disclaimer.

(21) Appl. No.: 13/619,754

(22) Filed: Sep. 14, 2012

(65) Prior Publication Data

US 2013/0014063 A1 Jan. 10, 2013

Related U.S. Application Data

(63) Continuation of application No. 12/423,427, filed on Apr. 14, 2009, now Pat. No. 8,291,347, which is a continuation of application No. 10/785,340, filed on Feb. 24, 2004, now Pat. No. 8,255,835.

(51) Int. Cl.
| | |
|---|---|
| *G06F 3/04895* | (2022.01) |
| *G06F 3/0482* | (2013.01) |
| *H04M 1/72436* | (2021.01) |
| *G06Q 10/107* | (2023.01) |
| *H04W 4/12* | (2009.01) |

(52) U.S. Cl.
CPC ........ *G06F 3/04895* (2013.01); *G06F 3/0482* (2013.01); *H04M 1/72436* (2021.01); *G06Q 10/107* (2013.01); *H04W 4/12* (2013.01)

(58) Field of Classification Search
CPC .................................................. G06F 3/04895
See application file for complete search history.

(56) References Cited

U.S. PATENT DOCUMENTS

| | | | |
|---|---|---|---|
| 2,498,082 A | 2/1950 | Johnson | |
| 5,003,577 A | 3/1991 | Ertz et al. | |
| 5,404,488 A * | 4/1995 | Kerrigan | G06F 17/3056 |
| | | | 707/E17.005 |
| 5,426,424 A | 6/1995 | Vanden Heuvel et al. | |
| 5,504,897 A | 4/1996 | Gans et al. | |
| 5,539,530 A | 7/1996 | Reifman et al. | |

(Continued)

FOREIGN PATENT DOCUMENTS

| | | |
|---|---|---|
| CA | 2 503 528 | 5/2004 |
| EP | 0 961 447 | 5/1998 |

(Continued)

OTHER PUBLICATIONS

Bing search q=unread%20email%20icon&qs=n&form=Q (Year: 2020).*

(Continued)

*Primary Examiner* — Cesar B Paula
*Assistant Examiner* — John M Heffington
(74) *Attorney, Agent, or Firm* — Fish & Richardson P.C.

(57) ABSTRACT

The presence of new unread electronic messages received, that is, messages received since unread messages were last reviewed, is provided by indicia presented to the user. These indicia can take various forms, such as by bolding, flashing, changing the size or color of a count of unread messages, and/or the unread message icon. Alternatively, a separate indication, such as a second count representing the number of new unread electronic messages received, or some other symbol, such as an explanation point, can be displayed.

18 Claims, 4 Drawing Sheets

(56) References Cited

U.S. PATENT DOCUMENTS

| | | | |
|---|---|---|---|
| 5,579,472 A * | 11/1996 | Keyworth, II | G06Q 10/107 715/751 |
| 5,617,539 A | 4/1997 | Ludwig et al. | |
| 5,687,216 A * | 11/1997 | Svensson | H04M 1/72547 379/357.02 |
| 5,758,079 A | 5/1998 | Ludwig et al. | |
| 5,764,901 A | 6/1998 | Skarbo et al. | |
| 5,794,039 A | 8/1998 | Guck | |
| 5,835,084 A * | 11/1998 | Bailey | G06Q 10/107 715/783 |
| 5,835,762 A | 11/1998 | Gans et al. | |
| 5,867,654 A | 2/1999 | Ludwig et al. | |
| 5,915,004 A | 6/1999 | Pabbati et al. | |
| 5,936,548 A * | 8/1999 | Takatsuka | G08B 5/227 340/7.52 |
| 5,966,351 A | 10/1999 | Carleton et al. | |
| 6,037,935 A | 3/2000 | Bates et al. | |
| 6,065,012 A | 5/2000 | Balsara et al. | |
| 6,078,820 A | 6/2000 | Wells et al. | |
| 6,092,101 A | 7/2000 | Birrell et al. | |
| 6,125,281 A | 9/2000 | Wells et al. | |
| 6,157,814 A | 12/2000 | Hymel et al. | |
| 6,192,396 B1 | 2/2001 | Kohler | |
| 6,212,547 B1 | 4/2001 | Ludwig et al. | |
| 6,216,127 B1 | 4/2001 | Gans et al. | |
| 6,337,699 B1 | 1/2002 | Nielsen | |
| 6,396,509 B1 | 5/2002 | Cheng | |
| 6,396,513 B1 | 5/2002 | Helfman et al. | |
| 6,429,772 B1 * | 8/2002 | Lizzi | G08B 5/227 340/10.6 |
| 6,466,654 B1 | 10/2002 | Cooper et al. | |
| 6,489,950 B1 | 12/2002 | Griffen et al. | |
| 6,557,036 B1 | 4/2003 | Kavacheri et al. | |
| 6,628,194 B1 | 9/2003 | Hellebust et al. | |
| 6,724,403 B1 | 4/2004 | Santoro et al. | |
| 6,731,308 B1 | 5/2004 | Tang et al. | |
| 6,741,268 B1 | 5/2004 | Hayakawa | |
| 6,757,372 B1 | 6/2004 | Dunlap et al. | |
| 6,778,069 B1 * | 8/2004 | Katagiri | H04W 68/00 340/7.51 |
| 6,792,085 B1 | 9/2004 | Rigaldies et al. | |
| 6,892,083 B2 | 5/2005 | Shostak | |
| 6,907,447 B1 * | 6/2005 | Cooperman | G06Q 10/107 709/203 |
| 6,925,605 B2 | 8/2005 | Bates et al. | |
| 6,944,481 B2 * | 9/2005 | Hama | H04M 1/0214 455/412.2 |
| 6,944,591 B1 * | 9/2005 | Raghunandan | G06Q 10/107 379/88.04 |
| 6,965,917 B1 | 11/2005 | Aloni et al. | |
| 6,981,223 B2 | 12/2005 | Becker et al. | |
| 7,028,264 B2 | 4/2006 | Santoro et al. | |
| 7,047,030 B2 | 5/2006 | Forsyth | |
| 7,058,683 B1 | 6/2006 | Belissent et al. | |
| 7,061,470 B1 | 6/2006 | Sharp | |
| 7,076,057 B1 | 7/2006 | Sharp | |
| 7,085,812 B1 | 8/2006 | Sherwood | |
| 7,102,765 B1 * | 9/2006 | Abi-Saleh | G09B 19/0053 358/1.13 |
| 7,120,474 B1 | 10/2006 | Sharp | |
| 7,151,923 B2 | 12/2006 | Boland et al. | |
| 7,181,701 B2 | 2/2007 | Howard et al. | |
| 7,185,054 B1 | 2/2007 | Ludwig et al. | |
| 7,212,814 B2 | 5/2007 | Wilson et al. | |
| 7,213,206 B2 | 5/2007 | Fogg | |
| 7,213,210 B2 | 5/2007 | Reysa | |
| 7,215,975 B1 | 5/2007 | Sharp | |
| 7,222,156 B2 * | 5/2007 | Gupta | G06F 17/241 709/206 |
| 7,234,112 B1 | 6/2007 | Brown et al. | |
| 7,248,881 B2 | 7/2007 | Shostak | |
| 7,254,410 B2 | 8/2007 | Park | |
| 7,257,415 B2 | 8/2007 | Shostak | |
| 7,281,201 B2 | 10/2007 | Kumar et al. | |
| 7,281,215 B1 * | 10/2007 | Canfield | G06Q 10/10 715/752 |
| 7,310,541 B2 | 12/2007 | Shostak | |
| 7,313,389 B1 | 12/2007 | Sharp et al. | |
| 7,319,743 B1 * | 1/2008 | Dunlap | H04M 1/247 379/142.17 |
| 7,376,907 B2 | 5/2008 | Santoro et al. | |
| 7,398,296 B2 | 7/2008 | Ludwig et al. | |
| 7,412,482 B2 | 8/2008 | Ludwig et al. | |
| 7,415,100 B2 | 8/2008 | Cooper et al. | |
| 7,421,470 B2 | 9/2008 | Ludwig et al. | |
| 7,433,920 B2 * | 10/2008 | Blagsvedt | G06Q 10/10 709/204 |
| 7,433,921 B2 | 10/2008 | Ludwig et al. | |
| 7,437,179 B1 | 10/2008 | Sharp | |
| 7,437,411 B2 | 10/2008 | Ludwig et al. | |
| 7,437,412 B2 | 10/2008 | Ludwig et al. | |
| 7,439,872 B2 | 10/2008 | Hiltunen | |
| 7,441,001 B2 | 10/2008 | Ludwig et al. | |
| 7,444,373 B2 | 10/2008 | Ludwig et al. | |
| 7,454,716 B2 | 11/2008 | Venolia | |
| 7,460,858 B2 | 12/2008 | Boland et al. | |
| 7,487,210 B2 | 2/2009 | Ludwig et al. | |
| 7,542,772 B2 | 6/2009 | Jun | |
| 7,605,801 B1 | 10/2009 | Sharp | |
| 7,634,528 B2 | 12/2009 | Horvitz et al. | |
| 7,669,140 B2 | 2/2010 | Matthews et al. | |
| 7,707,244 B2 | 4/2010 | Malik et al. | |
| 7,739,407 B1 | 6/2010 | Pakkala | |
| 7,908,320 B2 | 3/2011 | Ludwig et al. | |
| 7,920,678 B2 | 4/2011 | Cooper et al. | |
| 7,941,491 B2 | 5/2011 | Sood | |
| 7,987,431 B2 | 7/2011 | Santoro et al. | |
| 8,000,453 B2 | 8/2011 | Cooper et al. | |
| 8,019,834 B2 | 9/2011 | Horvitz et al. | |
| 8,121,649 B2 | 2/2012 | Shostak | |
| 8,196,051 B2 * | 6/2012 | Zaner | G06Q 10/10 715/751 |
| 8,255,835 B2 | 8/2012 | Bocking | |
| 8,291,347 B2 | 10/2012 | Bocking | |
| 2001/0008404 A1 * | 7/2001 | Naito | G06F 3/14 715/745 |
| 2002/0019852 A1 | 2/2002 | Bahar | |
| 2002/0060700 A1 * | 5/2002 | Sone | G08B 5/226 715/810 |
| 2002/0076004 A1 * | 6/2002 | Brockenbrough | H04L 51/36 379/67.1 |
| 2002/0099775 A1 * | 7/2002 | Gupta | G06Q 10/107 709/205 |
| 2002/0130904 A1 | 9/2002 | Becker et al. | |
| 2002/0160817 A1 | 10/2002 | Salmimaa et al. | |
| 2002/0170040 A1 | 11/2002 | Idan | |
| 2002/0191754 A1 * | 12/2002 | Liu | H04M 1/271 379/88.01 |
| 2002/0193128 A1 | 12/2002 | Park | |
| 2003/0014490 A1 | 1/2003 | Bates et al. | |
| 2003/0020671 A1 | 1/2003 | Santoro et al. | |
| 2003/0064707 A1 | 4/2003 | Yoneyama | |
| 2003/0073434 A1 | 4/2003 | Shostak | |
| 2003/0120957 A1 | 6/2003 | Pathiyal | |
| 2003/0152203 A1 * | 8/2003 | Berger | H04L 51/36 379/93.24 |
| 2004/0056893 A1 * | 3/2004 | Canfield | G06Q 10/107 715/753 |
| 2004/0073605 A1 | 4/2004 | Conley, Jr. | |
| 2004/0127241 A1 | 7/2004 | Shostak | |
| 2004/0130580 A1 | 7/2004 | Howard et al. | |
| 2004/0137882 A1 | 7/2004 | Forsyth | |
| 2004/0155908 A1 * | 8/2004 | Wagner | G06F 3/04817 715/854 |
| 2004/0155909 A1 * | 8/2004 | Wagner | G06F 3/04817 715/854 |
| 2004/0162773 A1 | 8/2004 | Del Rey et al. | |
| 2004/0176905 A1 | 9/2004 | Sanqunetti et al. | |
| 2004/0199663 A1 | 10/2004 | Horvitz et al. | |
| 2004/0259598 A1 | 12/2004 | Wagner et al. | |
| 2004/0266400 A1 | 12/2004 | Boland et al. | |
| 2004/0266403 A1 | 12/2004 | Boland et al. | |

(56) References Cited

U.S. PATENT DOCUMENTS

| | | |
|---|---|---|
| 2005/0053013 A1 | 3/2005 | Traylor et al. |
| 2005/0076110 A1 | 4/2005 | Mathew et al. |
| 2005/0080880 A1 | 4/2005 | von Tetzchner et al. |
| 2005/0114458 A1 | 5/2005 | Gottlieb |
| 2005/0114753 A1 | 5/2005 | Kumar et al. |
| 2005/0114781 A1 | 5/2005 | Brownholtz et al. |
| 2005/0013855 A1 | 6/2005 | Venolia |
| 2005/0138552 A1 | 6/2005 | Venolia |
| 2005/0170863 A1 | 8/2005 | Shostak |
| 2005/0193345 A1 | 9/2005 | Klassen et al. |
| 2005/0240983 A1 | 10/2005 | Peters |
| 2005/0248437 A1 | 11/2005 | Hellebust et al. |
| 2005/0283734 A1 | 12/2005 | Santoro et al. |
| 2006/0020677 A1 | 1/2006 | von Koch |
| 2006/0084450 A1* | 4/2006 | Dam Nielsen .... H04M 1/27455 455/466 |
| 2006/0106703 A1 | 5/2006 | Del Rey et al. |
| 2006/0189337 A1 | 8/2006 | Farrill et al. |
| 2006/0200455 A1 | 9/2006 | Wilson |
| 2007/0032269 A1 | 2/2007 | Shostak |
| 2007/0107014 A1 | 5/2007 | Howard et al. |
| 2007/0161400 A1 | 7/2007 | Sharp et al. |
| 2008/0057977 A1 | 3/2008 | Shostak |
| 2008/0140415 A1 | 6/2008 | Shostak |
| 2008/0140416 A1 | 6/2008 | Shostak |
| 2008/0201306 A1 | 8/2008 | Cooper et al. |
| 2009/0018834 A1 | 1/2009 | Cooper et al. |
| 2009/0018835 A1 | 1/2009 | Cooper et al. |
| 2009/0018839 A1 | 1/2009 | Cooper et al. |
| 2009/0132942 A1 | 5/2009 | Santoro et al. |
| 2009/0299934 A1 | 12/2009 | Horvitz et al. |
| 2010/0057875 A1 | 3/2010 | Bychkov et al. |
| 2010/0287483 A1 | 11/2010 | Smith et al. |

FOREIGN PATENT DOCUMENTS

| | | |
|---|---|---|
| EP | 1569146 | 8/2005 |
| JP | 2000295648 | 10/2000 |
| WO | WO 99/43171 A | 8/1999 |
| WO | WO 02/19082 | 3/2002 |
| WO | WO 2005/115035 | 12/2005 |

OTHER PUBLICATIONS

Bing search q=unread+email+indicator&qs=n&form= (Year: 2020).*
Cyrusoft International, Inc.: "Getting Started Guide—Mulberry IMAP Internet Mail Client Version 2.1." Internet Document, 2001, pp. 1-36, XP002278985.
G. Courter, et al., "Mastering Microsoft Office 2003 for Business Professional." Published by John Wiley and Sons, Feb. a6, 2004, ISBN 0782142281, 695 pages; http://books.google.com/books?id=VHPfK9CH8-sC; pp. 7, 28 and 38.
GMX: "GMX Handbuch," May 2003 (May 2003), Metys Verlag GmbH, Germany, XP002279699.
Microsoft Corporation, Microsoft Outlook 2000, 1999, Microsoft Corporation, Outlook main page.
Office Action in Canadian Patent Application 2,498,082, dated Mar. 23, 2010, counterpart of U.S. Appl. No. 10/785,340, 4 pp.
Office Action in Canadian Patent Application 2,572,423, dated Jun. 11, 2009, counterpart of U.S. Appl. No. 11/320,980, 3 pp.
Office Action in Canadian Patent Application 2,572,423, dated Mar. 9, 2010, counterpart of U.S. Appl. No. 11/320,980, 2 pp.
Office Action in copending U.S. Appl. No. 10/785,340 dated Apr. 1, 2009, 22 pp.
Office Action in copending U.S. Appl. No. 10/785,340 dated Apr. 13, 2010, 3 pp.
Office Action in copending U.S. Appl. No. 10/785,340 dated Aug. 20, 2008, 32 pp.
Office Action in copending U.S. Appl. No. 10/785,340 dated Aug. 23, 2007, 26 pp.
Office Action in copending U.S. Appl. No. 10/785,340 dated Feb. 20, 2008, 30 pp.
Office Action in copending U.S. Appl. No. 10/785,340 dated Jan. 12, 2012, 61 pages.
Office Action in copending U.S. Appl. No. 10/785,340 dated Mar. 20, 2007, 17 pp.
Office Action in copending U.S. Appl. No. 10/785,340 dated Oct. 28, 2009, 27 pp.
Office Action in copending U.S. Appl. No. 10/785,340 dated Oct. 31, 2007, 3 pp.
Office Action in copending U.S. Appl. No. 11/320,980 dated Dec. 24, 2008, 15 pp.).
Office Action in copending U.S. Appl. No. 11/320,980 dated Dec. 28, 2009, 15 pp.
Office Action in copending U.S. Appl. No. 11/320,980 dated Feb. 3, 2011, 3 pp.
Office Action in copending U.S. Appl. No. 11/320,980 dated Jan. 8, 2008, 13 pp.
Office Action in copending U.S. Appl. No. 11/320,980 dated Jul. 10, 2008, 14 pp.
Office Action in copending U.S. Appl. No. 11/320,980 dated Jun. 16, 2009, 14 pp.
Office Action in copending U.S. Appl. No. 11/320,980 dated Mar. 17, 2009, 3 pp.
Office Action in copending U.S. Appl. No. 11/320,980 dated Oct. 4, 2010, 14 pp.
Office Action in copending U.S. Appl. No. 11/320,980 dated Sep. 18, 2008, 3 pp.
Office Action in copending U.S. Appl. No. 11/320,980 dated May 11, 2011, 15 pages.
Office Action in copending U.S. Appl. No. 12/423,427 dated Aug. 4, 2011, 19 pages.
Office Action in copending U.S. Appl. No. 12/423,427 dated Jan. 20, 2012, 18 pages.
Office Action in corresponding Application 10/785,40 dated Jul. 1, 2011, 52 pages.
Office Action issued by Canadian Intellectual Property Office dated Aug. 5, 2011 for corresponding Canadian Patent No. 2,572,423, 3 pages.
Office Action issued by the Canadian Intellectual Property Office dated Apr. 20, 2011 for corresponding Canadian Patent Application No. 2,498,082, 4 pages.
Office Action issued by the Canadian Intellectual Property Office dated Apr. 23, 2012 for corresponding Canadian Patent Application No. 2,498,082, 4 pages.
Office Action issued by the European Patent Office dated Apr. 5, 2011 for corresponding EP Appln. No. 05113104.3-1238, 7 pages.
Robert Cowart, "Mastering Windows 95." 1995, Sybex, p. 571.
Search the Web (U.S. Appl. No. 12/423,427, filed May 4, 2012) http://www.ask.com/web?qsrc=1&o=0&1=dir&q=message+board+new+unread+message.
Search the Web (U.S. Appl. No. 12/423,427, filed May 4, 2012) http://www.ask.com/web?qsrc=1&o=0&1=dir&q=message+board+new+message.
Search the Web (U.S. Appl. No. 12/423,427, filed May 4, 2012) http://www.ask.com/web?qsrc=1&o=0&1=dir&q=new+unread+message.
Search the Web (U.S. Appl. No. 12/423,427, filed May 4, 2012) http://www.ask.com/web?qsrc=1&o=0&1=dir&q=new+unread+message+forum.
'Wikipedia' [online]. "Dialog Box", [retrieved on Nov. 20, 2007], Retrieved from the Internet: URL<Http://en.wikipedia.org/wiki/Dialog_box> 3 pages.
12423427_20120504 Ask-Search-qsrc_1_o_0_1_dir_q_message_board_new_mes.pdf.
12423427_20120504_Ask-Search-qsrc_1_o_0_1_dir_q_message_board_new_unr.pdf.
12423427_20120504_Ask-Search-qsrc_1_o_0_1_dir_q_new_unread_message.pdf.
12423427_20120504_Ask-Search-qsrc_1_o_0_1_dir_q_new_unread_message_fo.pdf.
European Office Action in European Application No. 04250989.3, dated Jun. 3, 2004, 4 pages.
European Search Report in European Application No. 04250989.3, dated May 12, 2004, 1 page.

(56) References Cited

OTHER PUBLICATIONS

European Office Action in European Application No. 04250989.3, dated Jan. 20, 2006, 5 pages.
European Office Action in European Application No. 04250989.3, dated Apr. 25, 2007, 7 pages.
European Office Action in European Application No. 04250989.3, dated Nov. 30, 2007, 15 pages.

* cited by examiner

METHOD AND SYSTEM FOR MANAGING UNREAD ELECTRONIC MESSAGES

CROSS-REFERENCE TO RELATED APPLICATION

The instant application is a continuation of U.S. patent application Ser. No. 12/423,427, filed Apr. 14, 2009, which is a continuation of U.S. patent application Ser. No. 10/785,340, filed Feb. 24, 2004, all of which are incorporated herein by reference.

BACKGROUND OF THE INVENTION

Field of the Invention

Aspects of this invention relate to the presentation of information providing assistance to a recipient in reviewing and processing electronic messages received. More particularly, they relate to a method and apparatus for managing unread electronic messages received.

Background Information

Electronic messaging has become a ubiquitous means of communication for both business and personal use. The volume of electronic messages received can be overwhelming. Devices that process electronic messages typically maintain a message list identifying electronic messages received for reading and processing by the recipient. Such processing can include replying to, deleting and filing the messages. It is common to provide a count of unread messages.

Recipients of electronic messages can be classified as either: (a) cleaners—those who file/delete electronic messages to maintain a clean message list that can then essentially be used as a task list; and (b) collectors—those who rarely file or delete electronic messages and leave numerous messages unread on an ongoing basis. Anecdotally, there is roughly a 50/50 split between cleaners and collectors within the user base of handheld electronic devices.

SUMMARY OF THE INVENTION

In accordance with an aspect of the invention, an indication is provided of the presence of new unread electronic messages received since the message list was last viewed (and potentially an e-mail message opened/viewed). This indication can merely signal that there are new unread messages or it can be quantitative and indicate the number of new unread messages received.

More particularly, one aspect of the invention is directed to a method of managing unread electronic messages received that comprises the steps of: providing an indication of the presence of unread electronic messages received; enabling scanning of the unread electronic messages received without reading; and generating an indication that new electronic messages have been received since the unread electronic messages received were last scanned. The presence of unread electronic messages can be provided through a visual display with the indication of new electronic messages received generated by altering the visual display. The visual display can be altered in various ways to indicate the presence of new unread electronic messages received. For instance, where the visual display provides a visual indication of the count of unread electronic messages received, the display can be altered by, for example, bolding, flashing, changing the size or changing the color of the count. Where an icon representing the presence of unread electronic messages is used in addition to the count of unread messages, the display can be altered by altering at least one of the icon and the count. Furthermore, the display can be altered to indicate the presence of new unread electronic messages received by adding an indicia, which can be a second count representing the number of new unread electronic messages received.

Another aspect of the invention is directed to a system for managing electronic messages received comprising: a display, a message list of electronic messages received with identification of those that are unread; an input means for selectively displaying the message list on the display for scanning for unread messages received; and indicator means on the display indicating the presence of new unread electronic messages received since the message list was last displayed. The indicating means can include means providing on the display a count of the unread electronic messages received in addition to the indication of the presence of new unread electronic messages received. The indicating means providing an indication of new unread electronic messages received can be an alteration to the count of the unread electronic messages received such as by at least one of bolding the count, flashing the count, changing the size of the count and changing the color of the count. Alternatively, the indicator means providing the indication of the presence of a new unread electronic message received can provide additional indicia on the display such as a second count that is a count of the new unread electronic messages received, or another symbol. Also, alternatively the indicator means can further comprise a message icon on the display adjacent the count of unread electronic messages received and the indication of the presence of new unread electronic messages received can be an alteration to the message icon, such as for example, by bolding, flashing, changing the size and/or changing the color of the icon.

BRIEF DESCRIPTION OF THE DRAWINGS

A full understanding of the invention can be gained from the following description of the preferred embodiments when read in conjunction with the accompanying drawings in which.

DESCRIPTION OF THE PREFERRED EMBODIMENTS

Figure 1:
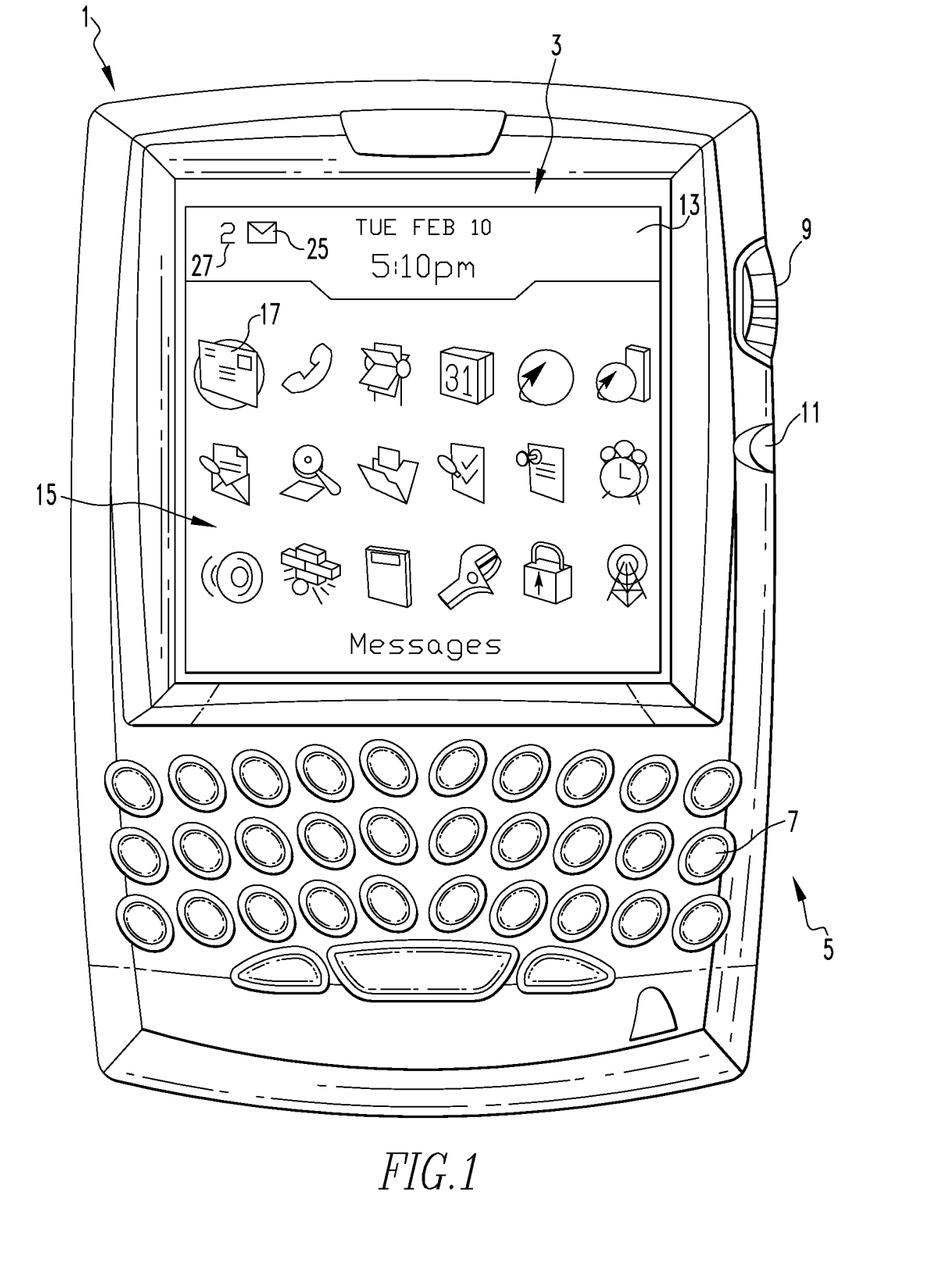
FIG. 1 is a front view of a handheld electronic device incorporating the invention and displaying the home screen indicating the presence of unread electronic messages received, but no new unread electronic messages received.

Aspects of the invention will be described as applied to a handheld electronic device. However, they are applicable to other devices that receive electronic messages such as workstations, desktop computers, laptop computers, cell phones and the like. In the exemplary embodiments of the invention, the electronic messages are text messages that are delivered over the Internet, an intranet or other communications channels, and can include wireless transmissions. Referring to FIG. 1, the handheld electronic device 1 has a display 3 and an input device 5 that includes a keyboard 7, a trackwheel 9 and an escape button 11. The display 3 can present a number of screens with FIG. 1 illustrating the home screen 13. The home screen 13 displays a number of icons 15 which can be highlighted by the trackwheel 9 to select one of a number of functions that can be performed by the device, as is known. An icon 17 can be selected to bring up on the display a message list 19 illustrated in FIG. 2, which presents summary information on all of the electronic messages received that have not yet been processed. This includes messages that have been read and those that are unread. Messages are read by scrolling through the message list with the trackwheel 9 and then pressing inward on the trackwheel to open the selected message. Messages that have been read are identified by the open envelope icon 21 at the left side of the message list 19. Those that are unread are identified by the closed envelope icon 23.

Figure 2:
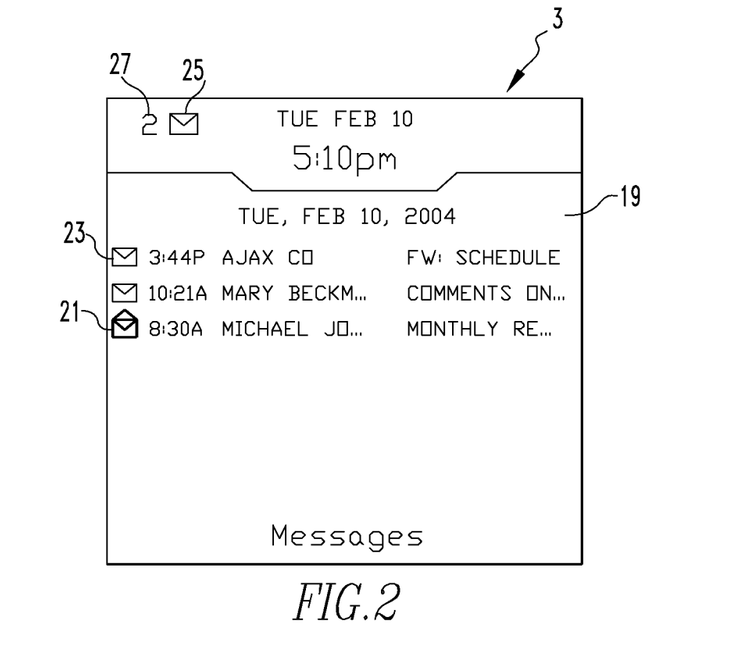
FIG. 2 is a message list displayed on the handheld electronic device of FIG. 1.

When there are unread electronic messages, a mail icon 25 is displayed in the top left corner of the message list screen 19 with an indicia of the number of unread electronic messages received in the form of a count 27 of unread messages presented to the left of the mail icon 25, as is common practice. In the example of FIG. 2, there are two unread electronic messages. Returning to FIG. 1, the mail icon 25 and unread message count 27 are also displayed in the upper left corner of the home screen 13 when there are unread electronic messages present.

Figure 3:
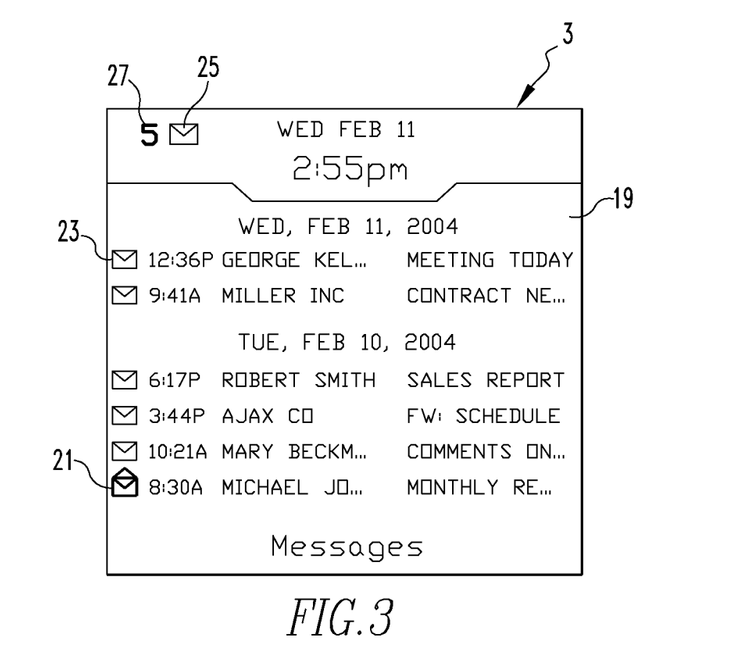
FIG. 3 is a message list similar to FIG. 2 illustrating the display of an indication of the presence of new unread electronic messages received in accordance with one embodiment of the invention.

As was mentioned, there are a significant number of recipients of electronic messages who do not regularly clean out their messages received because of the sheer volume of messages and/or the lack of time or inclination. Aspects of the invention help these people to manage their electronic messages received by providing an indication that new electronic messages have been received since the user last scanned the message list. FIG. 3 extends the example of FIG. 2 by illustrating the message list 19 at a later time when three new unread messages have been received since the list was last scanned to join the two old messages that remain unread. In accordance with this aspect of the invention, an indication of the presence of unread electronic messages received is provided. This is implemented, for example, by the mail icon 25 accompanied by the unread message count 27 presented on the home screen 13, as is common. Scanning of the unread electronic messages received without reading of the messages is enabled by calling up the message list 19 through selection of the read mail icon 17 from the home screen 13 shown in FIG. 1. An indication that new unread electronic messages have been received since the message list was last scanned is also provided. This indication can take many forms. In a first embodiment of the invention illustrated in FIG. 3, the unread message count 27 is bolded to provide this indication. The same bolding of the unread message count 27 is effected on the home screen 13 (not shown). The user may then call up from the home screen and scan the message list 19. As the messages are arranged in the order received, the user need only scan from the top of the message list to observe the new unread electronic messages received.

Figure 4:
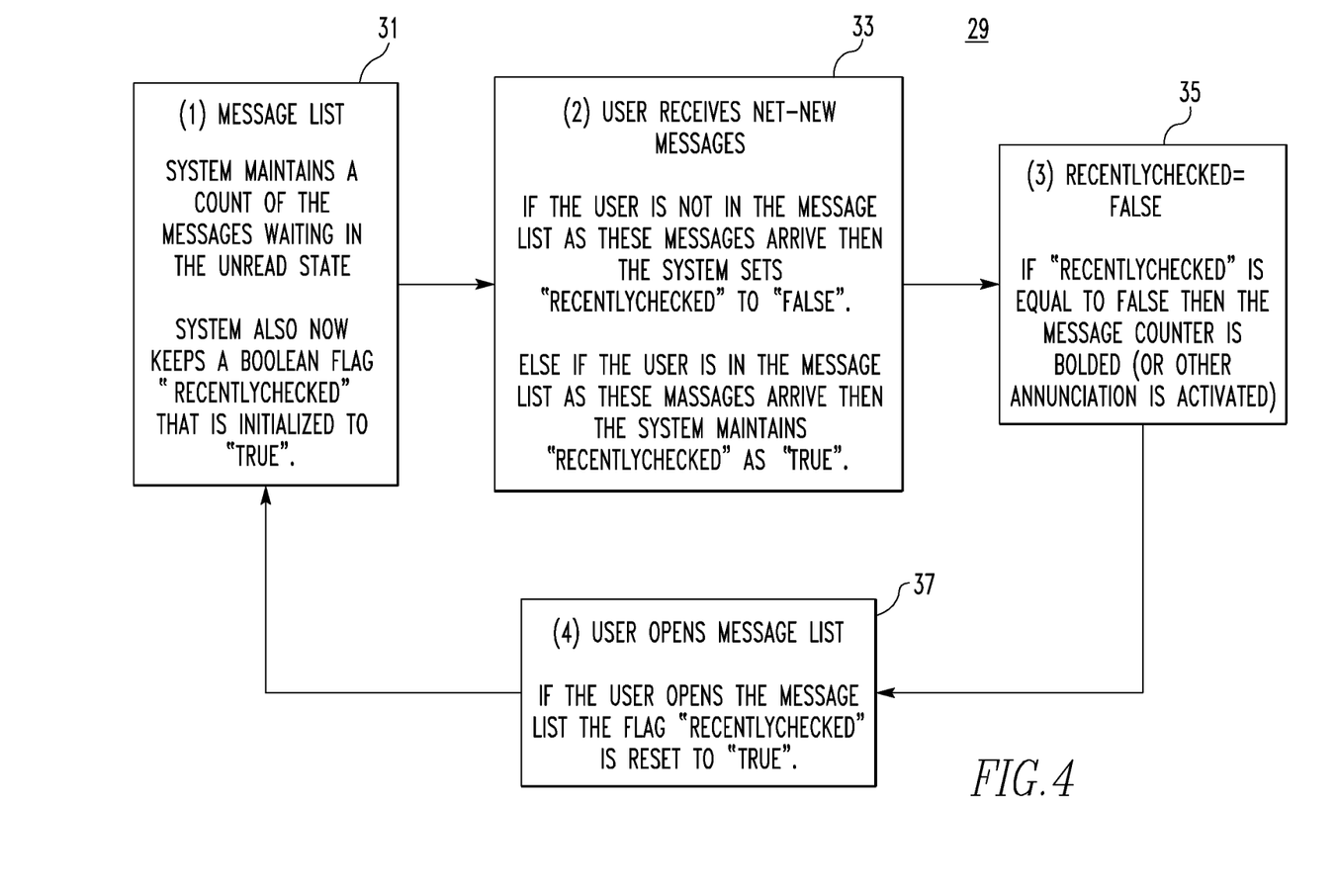
FIG. 4 is a flow chart illustrating implementation of the embodiment of FIG. 3.

FIG. 4 is a flow chart 29 illustrating the process. As indicated at 31, the system maintains a count of messages waiting in the unread state. The system also keeps a "recently checked" flag that is initialized to "true." When the user receives net-new messages at 33 and the device is not displaying the message list as these messages arrive, the "recently checked" flag is set to "false." If the user is viewing the message list as these new messages arrive, the system maintains the "recently checked" flag in the "true" state. When the "recently checked" flag is set to "false," the unread message count icon 27 is bolded at 35. Alternatively, as discussed below, other annunciations can be activated to provide the indication of the presence of new unread electronic messages received. When the user opens the message list 19 as indicated at 37, the "recently checked" flag is reset to "true" until additional new unread electronic messages are received. Alternatively, or in addition to bolding the unread message count 27, the mail icon 25 can be bolded.

Figure 5:
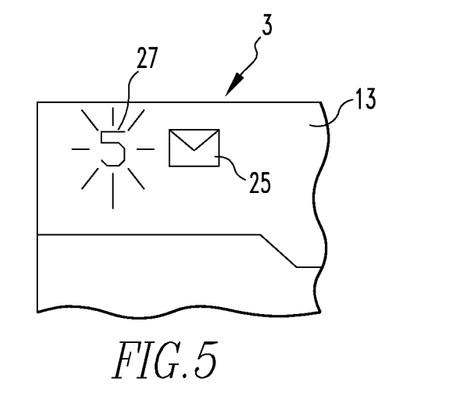
FIG. 5 is similar to FIG. 3 but illustrating a display of an indication of the presence of new unread electronic messages received in accordance with a second embodiment of the invention.

FIG. 5 illustrates a second embodiment of the invention in which the unread message count 27 is flashed to provide the indication of new unread electronic messages received. As in the case of bolding, alternatively or additionally, the mail icon 25 can be flashed.

Figure 6:
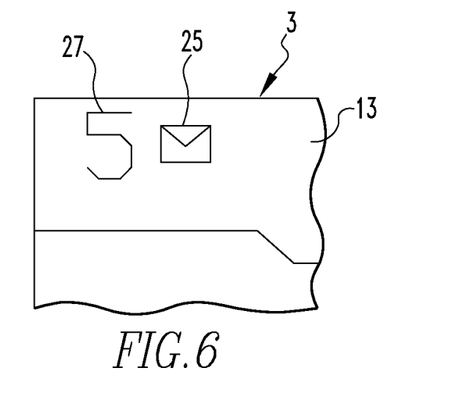
FIG. 6 is similar to FIG. 3 but illustrating a display of an indication of the presence of new unread electronic messages received in accordance with a third embodiment of the invention.

A third embodiment of the invention is illustrated in FIG. 6 where the size of the unread message count (and/or the size of the mail icon 25) can be increased to provide the indication of new unread messages received.

Figure 7:
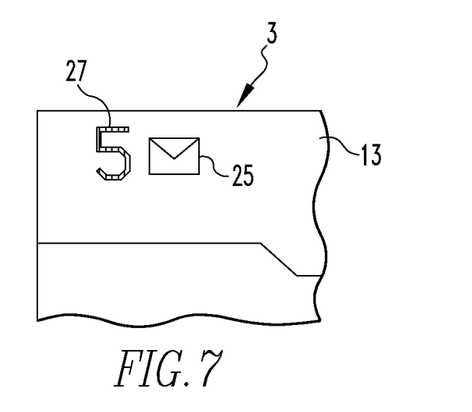
FIG. 7 is similar to FIG. 3 but illustrating a display of an indication of the presence of new unread electronic messages received in accordance with a fourth embodiment of the invention.

FIG. 7 illustrates a fourth embodiment of the invention in which the color of the unread message count 27 (and/or the mail icon 25) is changed to provide the indication of new unread electronic messages received. Where the device has a black and white display, the color change can be implemented by a negative image of the count (e.g., white on black instead of black on white).

Figure 8:
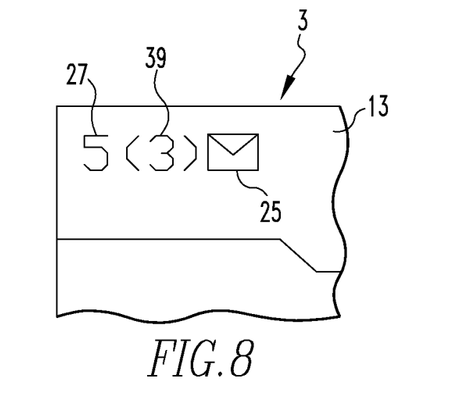
FIG. 8 is similar to FIG. 3 but illustrating a display of an indication of the presence of new unread electronic messages received in accordance with a fifth embodiment of the invention.

A fifth embodiment of the invention is illustrated in FIG. 8 where a second count 39, which is a count of the new unread messages received, is displayed on the home screen 13 in addition to the unread message count 27. This second count 39 can be distinguished, such as by placing it in parenthesis as shown in FIG. 8, making it a different color from the count 27, or by otherwise differentiating the two counts.

Figure 9:
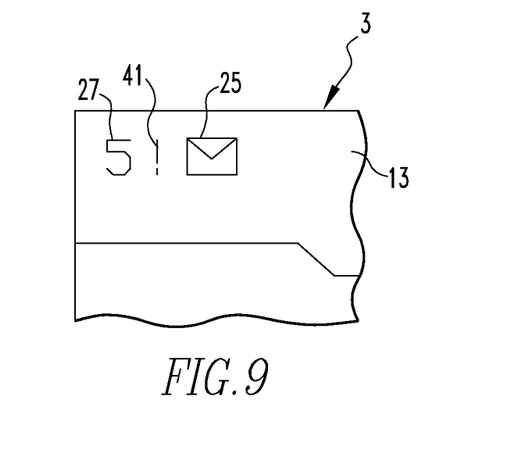
FIG. 9 is similar to FIG. 3 but illustrating a display of an indication of the presence of new unread electronic messages received in accordance with a sixth embodiment of the invention.

In yet another, sixth, embodiment of the invention, an additional indicia 41 is provided to indicate the presence of new unread electronic messages. In the example an explanation point is used. Clearly, other symbols could be used. In fact, it will be apparent at this point that other indicia, within the imagination of those skilled in the art, could be provided to indicate the presence of new unread electronic messages.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the claims appended and any and all equivalents thereof.

What is claimed is:

1. A method of managing unopened and undisplayed electronic messages on an electronic device, the method comprising the steps of:
   displaying a message listing on a display of the electronic device on a message listing screen, the message listing comprising a plurality of opened and unopened electronic messages, each of the opened and the unopened electronic messages comprising a respective indication of a given message's opened or unopened status;
   displaying, in addition to the message listing that includes the respective indication of the given message's opened or unopened status for the each of the opened and the unopened electronic messages, an unopened message indicator and a first indicator on the message listing screen, wherein the unopened message indicator indicates a presence of at least one unopened electronic message and the first indicator indicates a count of unopened electronic messages;
   displaying a home screen of the electronic device, wherein the home screen includes the unopened message indicator indicating the presence of at least one unopened electronic message, and that the home screen includes the first indicator indicating the count of unopened electronic messages;
   receiving at least one additional electronic message while the home screen is displayed on the display of the electronic device and the received at least one additional electronic message has not been displayed on the message listing screen;
   determining, by the electronic device, whether the electronic device is displaying the message listing when receiving the at least one additional electronic message; and
   in response to determining that the electronic device is not displaying the message listing when receiving the at least one additional electronic message, displaying at the home screen a second indicator in addition to the first indicator, wherein the second indicator indicates a count of at least one electronic message that is in the unopened state and that has not been displayed in the message listing, and wherein the second indicator and the first indicator have different count values.

2. The method of claim 1, wherein a third indicator is generated by applying an annunciation to the unopened message indicator when the second indicator is not displayed, and the annunciation to the unopened message indicator comprising at least one of:
   flashing, bolding, changing a size, or changing a color of the unopened message indicator.

3. The method of claim 1, wherein the unopened message indicator comprises an icon.

4. The method of claim 3, wherein the icon is an unopened mail icon.

5. The method of claim 1, wherein the second indicator is displayed distinguishable to the first indicator by at least one of:
   displaying the second indicator and the first indicator with different colors, or placing count value of the second indicator in parenthesis.

6. The method of claim 2, wherein an annunciation is added to the first indicator when the third indicator is displayed and the second indicator is not displayed, the annunciation to the first indicator comprising at least one of:
   flashing, bolding, changing a size, or changing a color of the first indicator.

7. A handheld electronic device comprising: an input device and a display, the handheld electronic device adapted to:
   display a message listing on the display of the handheld electronic device on a message listing screen, the message listing comprising a plurality of opened and unopened electronic messages, each of the opened and the unopened electronic messages comprising a respective indication of a given message's opened or unopened status;
   display, in addition to the message listing that includes the respective indication of the given message's opened or unopened status for the each of the opened and the unopened electronic messages, an unopened message indicator and a first indicator on the message listing screen, wherein the unopened message indicator indicates a presence of at least one unopened message electronic message and the first indicator indicates a count of unopened electronic messages;
   display a home screen of the handheld electronic device, wherein the home screen includes the unopened message indicator indicating the presence of at least one unopened electronic message, and that the home screen includes the first indicator indicating the count of unopened electronic messages;
   receive at least one additional electronic message while the home screen is displayed on the display of the handheld electronic device and the received at least one additional electronic message has not been displayed on the message listing screen;
   determine whether the handheld electronic device is displaying the message listing when receiving the at least one additional electronic message; and
   in response to determining that the handheld electronic device is not displaying the message listing when receiving the at least one additional electronic message, display at the home screen a second indicator in addition to the first indicator, wherein the second indicator indicates a count of at least one electronic message that is in the unopened state and that has not been displayed in the message listing, and wherein the second indicator and the first indicator have different count values.

8. The handheld electronic device of claim 7, wherein a third indicator is generated by applying an annunciation to the unopened message indicator when the second indicator is not displayed, and the annunciation comprising at least one of:
   flashing, bolding, changing a size, or changing a color of the unopened message indicator.

9. The handheld electronic device of claim 7, wherein the unopened message indicator comprises an icon.

10. The handheld electronic device of claim 9, wherein the icon is an unopened mail icon.

11. The handheld electronic device of claim 7, the handheld electronic device further adapted to display the second indicator that is distinguishable to the first indicator, wherein the handheld electronic device is adapted to at least one of:

display the second indicator and the first indicator with different colors, or place count value of the second indicator in parenthesis.

12. The handheld electronic device of claim 8, wherein an annunciation is added to the first indicator when the third indicator is displayed and the second indicator is not displayed, the annunciation to the first indicator comprising at least one of:

flashing, bolding, changing a size, or changing a color of the first indicator.

13. A non-transitory computer-readable storage medium storing instructions that, when executed by a processor of a device, causes the device to perform operations comprising:

displaying a message listing on a display of the device on a message listing screen, the message listing comprising a plurality of opened and unopened electronic messages, each of the opened and the unopened electronic messages comprising a respective indication of a given message's opened or unopened status;

displaying, in addition to the message listing that includes the respective indication of the given message's opened or unopened status for the each of the opened and the unopened electronic messages, an unopened message indicator and a first indicator on the message listing screen, wherein the unopened message indicator indicates a presence of at least one unopened electronic message and the first indicator indicates a count of unopened electronic messages;

displaying a home screen of the device, wherein the home screen includes the unopened message indicator indicating the presence of at least one unopened electronic message, and that the home screen includes the first indicator indicating the count of unopened electronic messages;

receiving at least one additional electronic message while the home screen displayed on the display of the device and the received at least one additional electronic message has not been displayed on the message listing screen;

determining whether the device is displaying the message listing when receiving the at least one additional electronic message; and in response to determining that the device is not displaying the message listing when receiving the at least one additional electronic message, displaying at the home screen a second indicator in addition to the first indicator, wherein the second indicator indicates a count of at least one electronic message that is in the unopened state and that has not been displayed in the message listing, and wherein the second indicator and the first indicator have different count values.

14. The non-transitory computer-readable storage medium of claim 13, wherein a third indicator is generated by applying an annunciation to the unopened message indicator when the second indicator is not displayed, and the annunciation to the unopened message indicator comprising at least one of:

flashing, bolding, changing a size, or changing a color of the unopened message indicator.

15. The non-transitory computer-readable storage medium of claim 13, wherein the unopened message indicator comprises an icon.

16. The non-transitory computer-readable storage medium of claim 15, wherein the icon is an unopened mail icon.

17. The non-transitory computer-readable storage medium of claim 13, the operations further comprising displaying the second indicator distinguishable to the first indicator by at least one of:

displaying the second indicator and the first indicator with different colors, or placing count value of the second indicator in parenthesis.

18. The non-transitory computer-readable storage medium of claim 14, wherein an annunciation is added to the first indicator when the third indicator is displayed and the second indicator is not displayed, the annunciation to the first indicator comprising at least one of:

flashing, bolding, changing a size, or changing a color of the first indicator.

\* \* \* \* \*